UNITED STATES PATENT OFFICE 2,397,421

2-THIO-4,6-DIAMINO-1,3,5-THIADIAZINE AND SALTS THEREOF

Donald W. Kaiser, Riverside, and Russell L. Sperry, Stamford, Conn., assignors to American Cyanamid Company, New York, N. Y., a corporation of Maine No Drawing. Application August 24, 1943, Serial No. 499,824

9 Claims. (Cl. 260—251)

This invention relates to new organic compounds and their preparation; more particularly to 2-thio-4,6-diamino-1,3,5-thiadiazine, its tautomers, and acid salts thereof.

The compound described and claimed herein by us and designated as 2-thio-4,6-diamino-1,3,5-thiadiazine is believed to have the following structural formula:

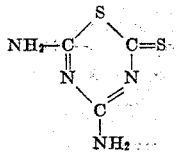

Chemical and physical properties of the compound indicate that it may also exist in whole or in part, in one or more tautomeric forms under certain conditions. One such tautomeric form may be as follows:

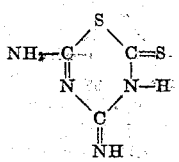

Such a tautomer would be named 2-thio-3-hydro-4-imino-6-amino-1,3,5-thiadiazine. Another possible tautomeric form is as follows:

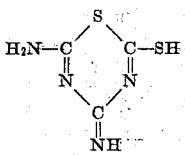

This form may be named 2-thiol-4-imino-6-amino-1,3,5-thiadiazine. Several other possible configurations could also be postulated. However, the structure first represented is believed to be the most likely structure of our new compounds and is being claimed herein with the understanding that tautomeric forms of the compound are to be considered as falling within the purview of our invention. Tautomerism in compounds of this type is a common phenomenon known to chemists.

2-thio-4,6-diamino-1,3,5-thiadiazine is weakly basic in character and forms salts with organic and inorganic acids having a dissociation constant of at least $1 \times 10^{-4}$. The compound occurs in the form of fine cotton-like needles when recrystallized from a large volume of water. It is surprisingly heat stable, not melting at temperatures as high as 360° C. and decomposing without melting when heated at higher temperatures. It is slightly soluble in water and some other solvents; such as, alcohol, Cellosolve, acetone and mixtures of water with these solvents, etc. It is also soluble in concentrated solutions of strong acids from which it may be recovered as an acid salt. The compound may be dissolved in solution of alkalies but in so doing, its molecular structure is very materially rearranged to form alkalimetal ω-cyanoguanidodithiocarbonates. The compounds of the present invention are useful particularly as intermediates in the preparation of dithioammelide and guanylthiourea. Other useful organic compounds may be prepared from the compounds of the present invention.

2-thio-4,6-diamino-1,3,5-thiadiazine may be prepared by treating an alkali metal ω-cyanoguanidodithiocarbonate with an acidic material. The acidic material may be a strong mineral acid such as, hydrochloric acid, sulfuric acid, phosphoric acid, or the like, or it may be an organic acid such as formic acid, acetic acid, α-chlorpropionic acid, benzoic acid, p-toluenesulfonic acid, or the like. Aqueous solutions of compounds such as carbon dioxide, hydrogen sulfide, zinc chloride, aluminum sulfate and the like are also sufficiently acidic to convert alkali metal ω-cyanoguanidodithiocarbonates into 2-thio-4,6-diamino-1,3,5-thiadiazine. Surprisingly enough, such acidic salts as zinc chloride and aluminum sulfate precipitate 2-thio-4,6-diamino-1,3,5-thiadiazine and do not form the zinc or aluminum salts of ω-cyanoguanidodithiocarbonic acid. Accordingly, we use the term "acidic material" hereinafter to include all of these different types and kinds of acidic materials.

In converting alkali metal ω-cyanoguanidodithiocarbonates to 2-thio-4,6-diamino-1,3,5-thiadiazine in accordance with our invention, it is merely necessary to dissolve a suitable alkali metal ω-cyanoguanidodithiocarbonate in water, or other solvent, and add an acidic material to the solution. 2-thio-4,6-diamino-1,3,5-thiadiazine is immediately precipitated as a finely crystalline, extremely bulky mass. The reaction may be represented as follows:

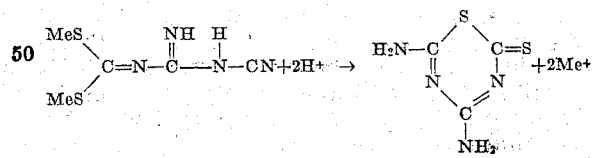

In the equation Me represents an alkali-metal and H+ is a hydrogen ion resulting from the presence of an acidic material in the reaction mixture. Because of the bulky nature of the precipitate, it is advisable that the reaction mixture be vigorously stirred to avoid occlusion of acidic material by the bulky precipitate. Also because of the nature of the precipitate, we prefer to use volatile acids such as acetic and hydrochloric which can be removed from the product by heating.

Since the reaction proceeds easily and completely to yield the desired reaction product at room temperatures, we ordinarily prefer to conduct the reaction by simply adding an acidic material in slight excess above the amounts indicated by the preceding equation to the solution of alkali metal ω-cyanoguanidodithiocarbonate. Temperatures within the range of 0° C. to about 40° C. may also be employed if desired.

Acid salts of 2-thio-4,6-diamino-1,3,5-thiadiazine may be prepared by treating the latter compound with moderately concentrated solutions of strong acids. By strong acids, we mean those acids having an ionization constant of $1 \times 10^{-4}$ or greater. The salts are ordinarily prepared by merely mixing the thiadiazine with the acid. The application of heat may be helpful in some cases in dissolving the reactants. Ordinarily salt formation occurs at once and the reaction can be considered complete within fifteen minutes. Cooling the resulting solution precipitates crystals of the acid salt. We have prepared the sulfuric acid, hydrochloric acid, toluenesulfonic acid, phosphoric acid, formic acid and salicylic acid salts of 2-thio-4,6-diamino-1,3,5-thiadiazine by this method. Other strong acids may also be employed to form thiadiazine salts.

Our invention will now be illustrated by means of the following specific examples in which 2-thio-4,6-diamino-1,3,5-thiadiazine is prepared in various ways from potassium ω-cyanoguanidodithiocarbonate. Other alkali-metal ω-cyanoguanidodithiocarbonates may be prepared and converted to 2-thio-4,6-diamino-1,3,5-thiadiazine in the same manner.

Example 1

19 g. of carbon disulfide was added to a stirred suspension of 24.4 g. of potassium dicyandiamide in 200 cc. of acetone. The mixture was then heated to refluxing temperature. Within a short time, the outer surface of the potassium dicyandamide crystals became yellow and the liquid light yellow in color. Refluxing was continued for 2.4 hours. The mixture was cooled, and a pale yellow solid consisting of equimolecular quantities of ω-cyanoguanidodithiocarbonate and dicyandiamide was obtained upon filtration. When the solid was dissolved in ice water and acidified with acetic acid, a precipitate of 2-thio-4,6-diamino-1,3,5-thiadiazine was obtained.

Example 2

A slurry of 1260 g. of dicyandiamide in 10 liters of acetone was cooled to 0° C., 1955 g. of 85% potassium hydroxide pellets and 1000 cc. of carbon disulfide were then added to the dicyandiamide solution with vigorous stirring. Before long the temperature began to rise steadily and the slurry became pale yellow. After three-fourths of an hour, the temperature was 17° C. and the slurry had become a thick cream of the insoluble yellow product. After 2.5 hours at a temperature between 10° and 20° C., the product was filtered, reslurried in a liter of cold acetone, filtered, washed with acetone and dried. The product was dipotassium ω-cyanoguanidodithiocarbonate.

To 1177 g. of dipotassium ω-cyanoguanidodithiocarbonate dissolved in 9 gallons of cold water was added slowly with stirring 650 cc. of glacial acetic acid. As the acetic acid was added, the solution became increasingly thick with a bulky white precipitate until at the neutral point the reaction mixture had become a thick slurry. As the acetic acid was added, the color of the slurry changed completely from a bright orange to a pale yellow color. The flocculent solid was centrifuged, and dried in an oven at 112° C. A yield of 616 g. of 2-thio-4,6-diamino-1,3,5-thiadiazine was obtained. A sample of the product, after being recrystallized several times from water, gave the following analysis:

|  | %C | %H | %N | %S |
|---|---|---|---|---|
| Calculated for $C_3H_4N_4S_2$ (2-thio-4,6-diamino-1,3,5-thiadiazine) | 22.50 | 2.50 | 35.00 | 40.00 |
| Found | 22.95 | 2.76 | 34.81 | 39.97 |

The product is very heat stable and decomposes without melting at temperatures above 360° C.

Example 3

A solution of 23.6 g. of dipotassium ω-cyanoguanidodithiocarbonate in 100 cc. of water was prepared and a solution of 13.6 g. of zinc chloride in 100 cc. of water was added thereto at room temperature. A light yellow solid first precipitated which changed rapidly into a nearly colorless cake. More water was added to the mixture and the solid filtered. The bulk of the solid was then boiled with about 800 cc. of water. However, a considerable amount of the material, probably zinc hydroxide, did not dissolve. Activated charcoal and filter aid were added to the mixture which was then filtered while hot. The undissolved solid was then extracted twice with two 800 cc. portions of hot water. As the combined filtrates cooled, colorless, needle-like crystals of 2-thio-4,6-diamino-1,3,5-thiadiazine formed. When filtered and dried the crystals weighed 12 g. On heating, they did not melt below 360° C. and when a portion was burned, with great difficulty, no ash remained.

Example 4

An aqueous solution of dipotassium ω-cyanoguanidodithiocarbonate was prepared, as in Example 2, and a stream of carbon dioxide bubbled slowly through the solution at room temperature. Within a few minutes a flocculent precipitate of 2-thio-4,6-diamino-1,3,5-thiadiazine commenced to form. Although the reaction appeared to be a neutralization reaction, the pH of the solution remained above 7 throughout. The product was recovered by filtration and when analyzed had the properties of 2,thio-4,6-diamino-1,3,5-thiadiazine as described in the preceding examples.

Example 5

The above experiment was repeated using hydrogen sulfide gas instead of carbon dioxide as the acidic material. 2-thio-4,6-diamino-1,3,5-thiadiazine was precipitated as before.

Example 6

8 g. of powdered 2-thio-4,6-diamino-1,3,5-thiadiazine was dissolved in 55 cc. of concentrated sulfuric acid and the orange colored solution poured over ice. The resulting solution was cooled in an ice bath and the yellow crystalline precipitate which formed was filtered, washed with dioxane and dried in a vacuum desiccator. The product, the acid sulfate salt of 2-thio-4,6-diamino-1,3,5-thiadiazine, had a melting point of 198° C.

*Example 7*

A slurry of 2-thio-4,6-diamino-1,3,5-thiadiazine in ethyl alcohol was refluxed with an excess of concentrated hydrochloric acid. After filtering and cooling the solution, the hydrochloride salt of 2-thio-4,6-diamino-1,3,5-thiadiazine crystallized.

*Example 8*

A slurry of 8 g. of 2-thio-4,6-diamino-1,3,5-thiadiazine and 13 g. p-toluene sulfuric acid monohydrate in 125 cc. of water was heated to boiling and the insolubles filtered. On cooling, the p-toluene sulfonic acid salt of 2-thio-4,6-diamino-1,3,5-thiadiazine precipitated in the form of yellow plate-like crystals which decomposed when heated at 218-22° C.

*Example 9*

Phosphoric acid (85%) was slowly added to a slurry of 8 g. of 2-thio-4,6-diamino-1,3,5-thiadiazine in 100 cc. of hot water until complete solution resulted. The yellow solution was filtered and after cooling yellow needle-like crystals of the phosphoric acid salt of 2-thio-4,6-diamino-1,3,5-thiadiazine were obtained.

We claim:

1. Compounds of the group consisting of 2-thio-4,6-diamino-1,3,5-thiadiazine, its tautomers, and the acid salts of such compounds.

2. 2-thio-4,6-diamino-1,3,5-thiadiazine.

3. 2-thio-4,6-diamino-1,3,5-thiadiazine hydrochloride.

4. 2-thio-4,6-diamino-1,3,5-thiadiazine acid sulfate.

5. A method of preparing 2-thio-4,6-diamino-1,3,5-thiadiazine which comprises mixing an alkali-metal ω-cyanoguanidodithiocarbonate with an acidic material and recovering the thus formed 2-thio-4,6-diamino-1,3,5-thiadiazine.

6. A method of preparing 2-thio-4,6-diamino-1,3,5-thiadiazine which comprises the step of mixing potassium ω-cyanoguanidodithiocarbonate with an acidic material at a temperature within the range of 0° C. to 40° C. and recovering the thus formed 2-thio-4,6-diamino-1,3,5-thiadiazine.

7. A method of preparing 2-thio-4,6-diamino-1,3,5-thiadiazine which comprises the step of mixing sodium ω-cyanoguanidodithiocarbonate with an acidic material at a temperature within the range of 0° C. to 40° C. and recovering the thus formed 2-thio-4,6-diamino-1,3,5-thiadiazine.

8. A method of preparing 2-thio-4,6-diamino-1,3,5-thiadiazine which comprises the step of mixing an alkali-metal ω-cyanoguanidodithiocarbonate with hydrochloric acid at a temperature within the range of 0° C. to 40° C. and recovering the thus formed 2-thio-4,6-diamino-1,3,5-thiadiazine.

9. A method of preparing 2-thio-4,6-diamino-1,3,5-thiadiazine which comprises the step of mixing an alkali-metal ω-cyanoguanidodithiocarbonate with acetic acid at a temperature within the range of 0° C. to 40° C. and recovering the thus formed 2-thio-4,6-diamino-1,3,5-thiadiazine.

DONALD W. KAISER.
RUSSELL L. SPERRY.